United States Patent Office 3,337,535
Patented Aug. 22, 1967

3,337,535
DERIVATIVES OF 4-AZA-3,5-CYCLOCHOLESTANE
Richard M. Scribner, Wilmington, Del., assignor to E. I. du Pont de Nemours and Company, Wilmington, Del., a corporation of Delaware
No Drawing. Filed June 15, 1966, Ser. No. 557,628
6 Claims. (Cl. 260—239)

This invention relates to novel aziridinyl steroid derivatives of the cholestane structure. More specifically, the invention concerns derivatives of 4-aza-3,5-cyclocholestane, i.e., steroids wherein the aziridine or ethyleneimine ring is part of the steroid nucleus.

The novel steroids of this invention can be represented by the structural formula

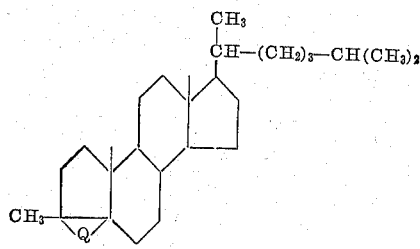

wherein Q is an aza group selected from

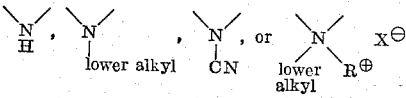

wherein R is selected from hydrogen or lower alkyl and X is the anion of a strong acid. The term "lower alkyl" is defined herein as an alkyl group having 1 through 6 carbon atoms. The configuration (α or β) of the 3,5; 3,4; and 4,5 bonds of the A-nor ring has not been definitely established, and all these bonds have been represented herein by solid lines.

The starting material used for the preparation of the compounds of this invention is 3-methyl-A-nor-3-cholestene, which can be prepared from cholesterol by a sequence of reactions described by H. Schmid and K. Kägi, Helv., 33, 1582 (1950); and F. S. Prout and B. Riegel, J. Am. Chem. Soc., 74, 3190 (1952). Treatment of the A-nor-steroid with cyanogen azide in an inert solvent, such as an ester, at moderate temperature, e.g., 40–75° C., affords 3-methyl-N-cyano-4-aza-3,5-cyclocholestane in accordance with the equation:

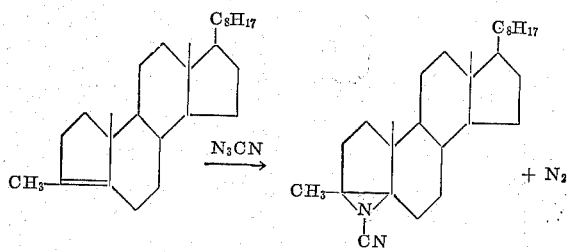

Reduction of 3-methyl-N-cyano-4-aza-3,5-cyclocholestane with an alkali metal aluminum hydride such as sodium, potassium or lithium aluminum hydride, preferably the latter, at a temperature in the range of about 0–100° C. in an inert, non-hydroxylic solvent such as diethyl ether, di-n-butyl ether, ethyleneglycol dimethyl ether, dioxane or tetrahydrofuran, followed by treatment with water gives 3-methyl-4-aza-3,5-cyclocholestane in accordance with the equation:

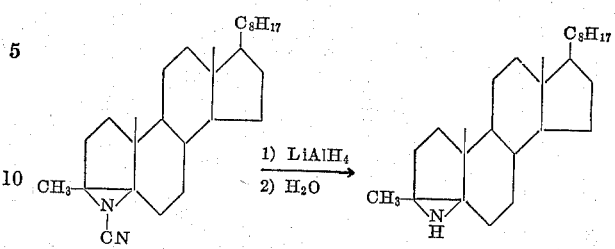

Treatment of 3-methyl-4-aza-3,5-cyclocholestane with an alkylating agent such as a lower alkyl halide, lower alkyl p-toluenesulfonate, or lower alkyl sulfate in an inert solvent such as an aliphatic or aromatic hydrocarbon gives a quaternary amine salt of the type

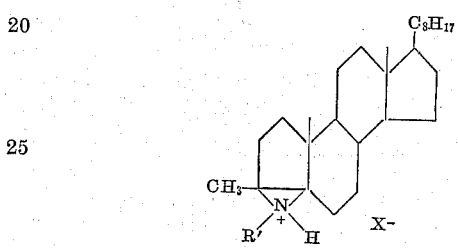

wherein R' is a lower alkyl radical such as methyl, ethyl, propyl, isopropyl, n-butyl, sec.-butyl, n-amyl, n-hexyl, and the like, and X⁻ is the halide, p-toluenesulfonate, or sulfate anion. By conventional metathetical reactions, the anion can be replaced by the anion of other strong acids, such as benzenesulfonic acid, sulfuric acid, or nitric acid, so that the anion X⁻ can be defined as the anion, or conjugate base, of a strong acid.

Upon treatment with an inorganic base, such as an alkali metal (sodium or potassium) carbonate or hydroxide, or, most conveniently, by passage over alkaline alumina or through an anion-exchange resin, the quaternary amine salt is converted to the corresponding 3-methyl-N-alkyl-4-aza-3,5-cyclocholestane in accordance with the equation:

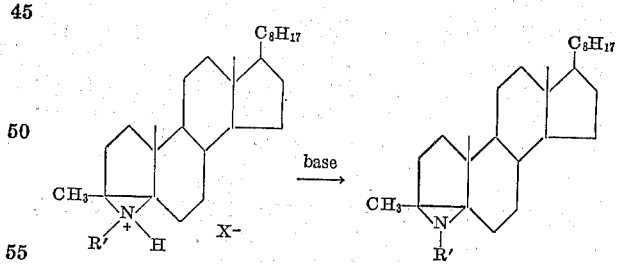

The reaction medium may be an aqueous medium, but preferably is a substantially water-free, inert organic liquid which is a solvent for the reaction product, such as acetone, dioxane, tetrahydrofuran, di-n-butyl ether, methanol, ethanol, and the like. The reaction is carried out at or near room temperature, i.e., in the range 10–30° C., but moderate heating, e.g., up to 50–75° C., can be applied if desired. If, instead, the reaction is carried out on a column of basic alumina or basic ion-exchange resin, the amine salt is applied as a solution in a polar solvent such as methanol or ethanol, and is then eluted from the column as the free amine.

Other products of this invention are obtained by additional reactions using conventional methods. For example, a 3-methyl-N-alkyl-4-aza-3,5-cyclocholestane of the type shown above is converted, upon being treated in a known manner with an alkyl ester of a strong inorganic or organic acid (e.g., an alkyl halide, sulfate, arylsulfonate, etc.), to a quaternary amine salt

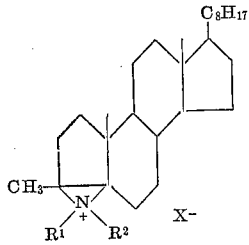

where $R^1$ and $R^2$ are both lower alkyl radicals, which may be the same or different, and $X^-$ is the conjugate base of a strong inorganic or organic acid (e.g., a halogen acid, sulfuric acid, arylsulfonic acid, etc.).

The steroids of this invention can be purified, when necessary, by the usual crystallization methods from appropriate solvents or by chromatographic methods, preferably over alumina.

Cyanogen azide is prepared by reacting a cyanogen halide, preferably cyanogen chloride, with a metal, ammonium or organoammonium azide, preferably sodium azide, under anhydrous conditions, at a temperature in the range of $-50°$ C. to $+25°$ C. Caution is indicated since cyanogen azide is an unstable liquid which, when isolated, is explosively sensitive to heat or shock. However, its solutions in organic solvents are not explosive and can be stored, handled and used with safety. A typical preparation is described by Marsh and Hermes in J. Am. Chem. Soc., 86, 4506 (1964).

The following examples illustrate the invention in further detail:

EXAMPLE 1

3-methyl-N-cyano-4-aza-3,5-cyclocholestane 3-methyl-A-nor-3-cholestene was prepared from i-cholestanone by a procedure similar to that described by F. S. Prout and B. Riegel (loc. cit.).

A mixture of 3.7 g. of 3-methyl-A-nor-3-cholestene and 5.0 ml. of 3.0 M cyanogen azide in 100 ml. of ethyl acetate was heated at 50–52° C. for 23 hours, during which time a total of 293 ml. of gas was evolved. Evaporation of the amber solution to dryness in vacuo gave an amber glass which was applied in benzene to a column of 150 g. of neutral, activity grade III alumina. Elution of the column with mixtures of petroleum ether, benzene, and ether, gave in the benzene-petroleum ether (1:1) eluant crude 3-methly - N - cyano-4-aza-3,5-cyclocholestane. Crystallization from acetone and then cyclohexane gave the pure product as colorless needles, M.P. 182–184° C., $[\alpha]_D^{23}$ +68° (c., 1.6, $CHCl_3$);

$$\lambda_{max.}^{CHCl_3} 4.55\mu (C \equiv N)$$

Analysis.—Calcd. for $C_{28}H_{46}N_2$: C, 81.89; H, 11.29; N, 6.82. Found: C, 82.21; H, 11.40; N, 6.98.

EXAMPLE 2

3-methyl-4-aza-3,5-cyclocholestane

To a solution of 0.50 g. of lithium aluminum hydride in 50 ml. of ether was added 1.0 g. of 3-methyl-N-cyano-4-aza-3,5-cyclocholestane. The mixture was heated at reflux temperature for 24 hours, cooled, and treated cautiously with excess water saturated with sodium sulfate. Filtration, washing the filter cake with ether, and evaporation of the combined filtrates, gave 0.936 g. of a colorless glass which was crystallized from acetone-water to give 0.80 g. of 3-methyl-4-aza-3,5-cyclocholestane, M.P. 87.5–88.5° C. Chromatography on 40 g. of basic, activity grade III alumina, eluting with petroleum etherbenzene (9:1), gave 0.70 g. of analytically pure 3-methyl-4-aza-3,5-cyclocholestane, M.P. 89.0–90.0° C. (acetone-water); $[\alpha]_D^{23}$ +43° (c., 1.2, $CHCl_3$).

Analysis.—Calcd. for $C_{27}H_{47}N$: C, 84.08; H, 12.28. Found: C, 84.21; H, 12.11.

EXAMPLE 3

3,4-dimethyl-4-aza-3,5-cyclocholestane hydroiodide

A solution of 1.0 g. of 3-methyl-4-aza-3,5-cyclocholestane in 50 ml. of cyclohexane and 3.0 ml. of methyl iodide was heated at reflux temperature for 15 hours. The resulting precipitate of 3,4-dimethyl-4-aza-3,5-cyclocholestane hydroiodide after collection by filtration and washing with petroleum ether, weighed 1.2 g., and melted over the range 207–215° C.

Analysis.—Calcd. for $C_{28}H_{50}NI$: C, 63.6; H, 9.54. Found: C, 63.1; H, 9.48.

In like manner reaction of 3-methyl-4-aza-3,5-cyclocholestane with ethyl sulfate, n-butyl bromide, or isobutyl-p-toluenesulfonate gives, respectively, 3-methyl-4-ethyl-4-aza-3,5-cyclocholestane hydrosulfate; 3-methyl-4-n-butyl-4-aza-3,5-cyclocholestane hydrobromide; and 3-methyl-4-iso-butyl-4-aza - 3,5 - cyclocholestane hydro-p-toluenesulfonate.

EXAMPLE 4

3,4-dimethyl-4-aza-3,5-cyclocholestane

A solution of 2.0 g. of the hydroiodide of Example 3 in about 8 ml. of methanol was applied to 100 g. of basic, activity grade III alumina. Elution with petroleum ether gave 1.38 g. of crystalline 3,4-dimethyl-4-aza-3,5-cyclocholestane, M.P. 116.5–117.5° C. (acetone); $[\alpha]_D^{23}$ +56° (c. 1.1, $CHCl_3$);

$$\lambda_{max.}^{CCl_4} 3.38, 3.47, 7.25\mu$$

Analysis.—Calcd. for $C_{28}H_{49}N$: C, 84.14; H, 12.36; N, 3.50. Found: C, 83.83; H, 12.24; N, 3.32.

In like manner treatment of the 3-methyl-4-ethyl-4-aza-3,5-cyclocholestane hydrosulfate; 3-methyl-4-n-butyl-4-aza-3,5-cyclocholestane hydrobromide, and 3-methyl-4-iso-butyl-4-aza-3,5-cyclocholestane hydro-p-toluenesulfonate with an acid acceptor affords, respectively, 3-methyl-4-ethyl-4-aza-3,5-cyclocholestane; 3 - methyl-4-n-butyl-4-aza-3,5-cyclocholestane; and 3-methyl-4-iso-butyl-4-aza-3,5-cyclochlolestane.

Treatment of the 3-methyl-4-alkyl-4-aza-3,5-cyclocholestanes illustrated in Example 4 with alkylating agents gives the corresponding dialkyl quaternary ammonium salts. For example, treatment of 3,4-dimethyl-4-aza-3,5-cyclocholestane with n-propyl iodide in refluxing cyclohexane affords 3 - methyl-4-n-propyl-4-aza-3,5-cyclocholestane-3-methiodide, and treatment of 3-methyl-4-n-butyl-4-aza-3,5-cyclocholestane with ethyl iodide gives 3-methyl-4-n-butyl-4-aza-3,5-cyclocholestane-4-ethiodide.

The 3-methyl-4-aza-3,5-cyclocholestane derivatives of this invention exhibit useful fungistatic properties. For example, when spores of the fungus Candida albicans were inoculated into potato dextrose broth containing various concentrations of test compounds, and then incubated at 30° C. for 72 hours, it was found that 3,4-dimethyl-4-aza-3,5-cyclocholestane (the product of Example 4) exhibited a minimum inhibitory concentration of 1 μg./ml.; the corresponding hydroiodide (the product of Example 3) also exhibited a minimum inhibitory concentration of 1μg./ml. Under comparable conditions 3-methyl-4-aza-3,5-cyclocholestane showed against either Aspergillus niger or Aspergillus flavus minimum inhibitory concentrations of 100 μg./ml.

The foregoing detailed description has been given for clearness of understanding only and no unnecessary limitations are to be understood therefrom. The invention is The embodiments of the invention in which an exclusive property or privilege is claimed are defined as follows:

1. Steroids of the structural formula

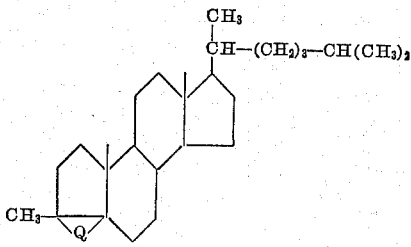

wherein Q is selected from

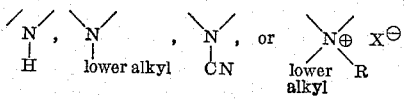

where R is selected from hydrogen or lower alkyl and X is the anion of a strong acid.

2. The steroid of claim 1 wherein Q is

3. The steroid of claim 1 wherein Q is

4. The steroid of claim 1 wherein Q is

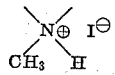

5. The steroid of claim 1 wherein Q is

6. The steroid of claim 1 wherein Q is

No references cited.

ALTON D. ROLLINS, *Primary Examiner.*